United States Patent
Cramer et al.

(10) Patent No.: US 6,728,897 B1
(45) Date of Patent: Apr. 27, 2004

(54) NEGOTIATING TAKEOVER IN HIGH AVAILABILITY CLUSTER

(75) Inventors: Samuel M. Cramer, Sunnyvale, CA (US); Scott Schoenthal, San Ramon, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 519 days.

(21) Appl. No.: 09/625,234

(22) Filed: Jul. 25, 2000

(51) Int. Cl.$^7$ .................................................. G06F 11/00
(52) U.S. Cl. ...................... 714/6; 714/4; 714/5; 714/10
(58) Field of Search .................... 714/4–6, 10

(56) References Cited

U.S. PATENT DOCUMENTS

| | | | |
|---|---|---|---|
| 4,937,763 A | | 6/1990 | Mott .......................... 364/550 |
| 5,067,099 A | | 11/1991 | McCown et al. ........... 364/550 |
| 5,157,663 A | * | 10/1992 | Major et al. .................. 714/10 |
| 5,633,999 A | * | 5/1997 | Clowes et al. .................. 714/6 |
| 5,781,770 A | * | 7/1998 | Byers et al. ................. 713/502 |
| 5,812,748 A | * | 9/1998 | Ohran et al. .................... 714/4 |
| 5,812,751 A | * | 9/1998 | Ekrot et al. ..................... 714/4 |
| 5,951,695 A | * | 9/1999 | Kolovson ..................... 714/16 |
| 6,119,244 A | * | 9/2000 | Schoenthal et al. ............. 714/4 |
| 6,292,905 B1 | * | 9/2001 | Wallach et al. ................. 714/4 |
| 6,625,749 B1 | * | 9/2003 | Quach ......................... 714/10 |

FOREIGN PATENT DOCUMENTS

EP    0537098    4/1993

* cited by examiner

*Primary Examiner*—Robert Beausoliel
*Assistant Examiner*—Michael Maskulinski
(74) *Attorney, Agent, or Firm*—Swernofsky Law Group PC

(57) ABSTRACT

The invention provides a method and system in which a node in a 2-node high availability cluster can declare itself impaired. In doing so, an impaired node can self diagnose or request another node in the cluster assist in diagnosing the problem. An impaired node can then request another node takeover the impaired node's tasks whereby the impaired node is able to shut down gracefully.

33 Claims, 2 Drawing Sheets

NEGOTIATING TAKEOVER IN HIGH AVAILABILITY CLUSTER

BACKGROUND OF THE INVENTION

1. Field of the Invention

This invention relates to negotiated takeovers in high availability clusters that enable high availability to be maintained after suffering soft failures.

2. Related Art

File servers create a critical link to information that is accessed by system users. Data is the lifeblood of every corporation, and with the explosive growth of the Internet great emphasis has been placed on the ability of systems to deliver data to users quickly and efficiently. A major focus of these efforts is concern regarding how information can be provided when the system providing it suffers a failure.

Filer failures come in two basic varieties that are best described as "Hard Failures" and "Soft Failures." For example, when a node in a high availability cluster becomes unable to communicate with other nodes in the cluster it is presumed to have suffered a hard failure—this is often characterized when a filer loses power.

Additionally, when a filer in a high availability cluster loses the ability to read a portion of a disk that it should be able to read, this is considered a Soft Failure as the filer is only partially impaired and is generally able to communicate with other nodes in the cluster.

The problem with the current state of the art is that soft failures are ignored by the cluster failover logic, so a filer that has suffered a soft failure continues to operate in whatever capacity it is able. This can be devastating to the overall performance of the filer cluster, thus this approach does not execute the most efficient use of available sources and severely impacts information delivery.

One known method of effecting a takeover in a high availability cluster occurs when a multi-node system is utilizing a protocol transmitted between the nodes that identifies that each node is still functioning. When this heartbeat-like message ceases from a node, the other nodes know that the node without a heartbeat has died. Consequently, one or more nodes in the cluster may take over some or all of the affected node's tasks.

This method of takeover is widely available and quite effective, but it suffers from a severe drawback. It is oblivious to soft failures. For example, in a 2-node cluster, one of the nodes may be able to access only a portion of its designated storage areas due to a cabling problem. The impaired node, however, may be able to send the heart-beat message to the other node if effect fooling the other node into believing the affected node is fully functional when in fact it has suffered a soft failure and should be taken over.

Utilizing certain novel techniques a filer impaired by a soft failure can self diagnose or assist other filers in collectively diagnosing its operation. Through this diagnosis the filer can determine whether the problem is with some other component of the system or with its self. At this point it may continue operation in whatever capacity it is able or it may negotiate a shutdown and takeover in a controlled manner with one or more other filers.

For example, filer 1 in a 2-node high availability cluster may determine it cannot read disk 1 when it should be able to. It then asks filer 2 if it is able to read disk 1 knowing that filer 2 should be able to read disk 1. If filer 2 informs filer 1 that it can read disk 1 then filer 1 knows it is impaired and can take appropriate action. If filer 2 informs filer 1 that it is also unable to read disk 1, filer 1 can conclude that the problem is elsewhere and can take appropriate action. Additionally, filer 2 can take note that access to disk 1 is impaired but is not attributable to its operation.

In general, a takeover of one node by another is an all or nothing process and in the example above the appropriate action taken may include requesting filer 2 takeover while filer 1 shuts down until it is again fully functional. The invention, however supports the concept that under certain circumstances partial functionality may be passed to create load sharing based on criteria designed to create optimal utilization of resources.

This could occur when both nodes in a 2-node cluster have partially failed and some functionally is better than none at all. Both nodes could remain online, or one being more impaired than the other could shut down allowing the remaining node to takeover in whatever capacity it is able through a negotiated takeover process. This would allow the offline node time to be restored to a fully functional capacity and then a negotiated take over could occur to bring the restored node online. The process would then be repeated for the other impaired node resulting in a fully functional cluster and the best possible information availability while being executed.

Accordingly, it would be advantageous to provide a technique for takeover of a node in a high availability file server cluster after the node has suffered a Soft Failure so as to maintain high availability of information and use available resources to their maximum potential.

SUMMARY OF THE INVENTION

Thus, the invention includes a system and method for at least one node in a multi-node high availability cluster to declare itself impaired and request that that at least one other node takeover some or all of its functions. This situation may occur when a node suffering a soft failure notifies the other nodes in a cluster that it is in trouble and is requesting help from the other nodes. The other nodes can assist the affected node with a diagnosis of the problem through collective intelligence and comparison diagnostics or the affected node can self diagnose the problem.

Following this analysis stage an assisting node determines whether it is impaired or was recently impaired and is recovering from a failure. If the assisting node determines it is not impaired or recovering from recent impairment it may offer to takeover the affected node's functions. The takeover process commences with the assisting node requesting the impaired node shutdown and a takeover timer is started. This gives the impaired node a predetermined time period in which to gracefully shutdown, and once it has shut down the assisting node takes over. If the affected node has not shut down at the expiration of the takeover timer, the assisting node sends kill messages to the affected node that force it to shut down. The assisting node then takes over the functions of the affected node.

DETAILED DESCRIPTION OF THE PREFERRED EMBODIMENT

In the following description, a preferred embodiment of the invention is described with regard to preferred process steps and data structures. Embodiment of the invention can be implemented using general purpose processors or special purpose processors operating under program control, or other circuits, adapted to particular process steps and data structures described herein. Implementation of the process steps and data structures described herein would not require undue experimentation or further investigation.

Lexicography

The following terms refer to or relate to aspects of the invention as described below. The descriptions of general meanings of these terms are not intended to be limiting, only illustrative.

filer—This term refers to a file server. A file server is a computer and storage device dedicated to storing files.

cluster—This term refers to a number of filers.

node—In networks, a processing location. A node can be a file server or some other device, such as a printer.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part the scope and spirit of the invention, and would be clear to those of ordinary skill in the art, without further invention or undue experimentation.

System Elements

Figure 1:
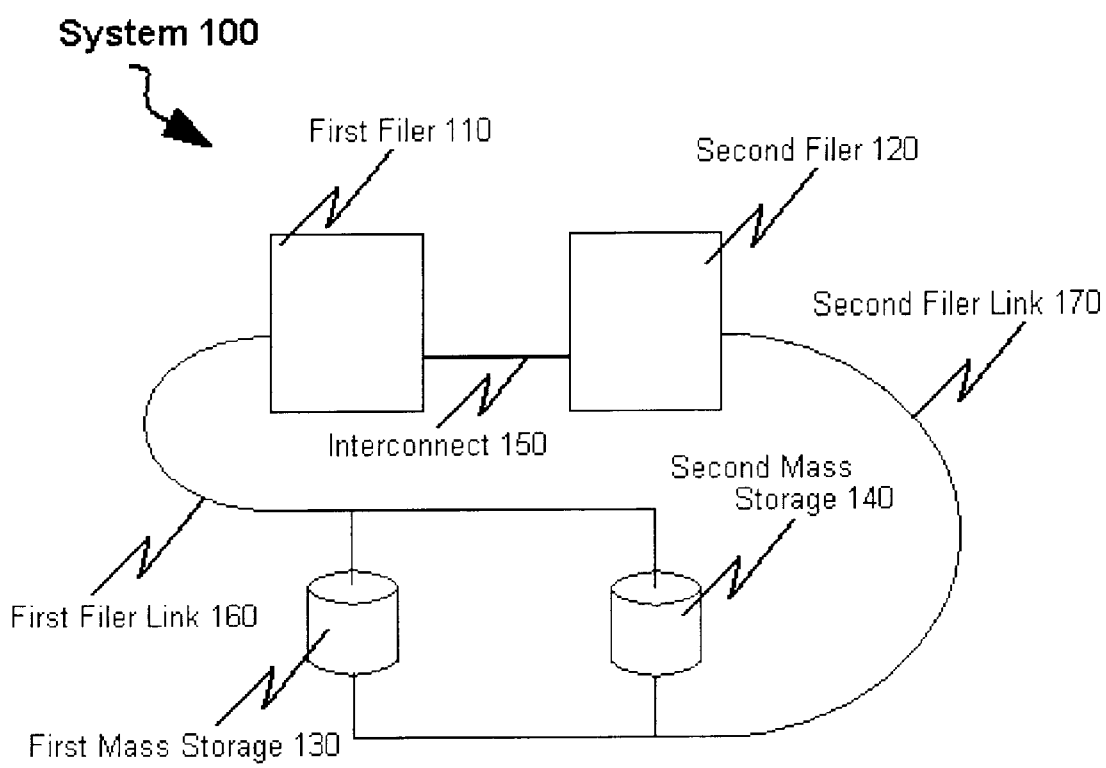
FIG. 1 illustrates a block diagram of a system for Negotiating Takeover in High Availability Cluster.

FIG. 1 shows a block diagram of a system for Negotiating Takeover in High Availability Cluster.

A system 100 includes a first filer 110, a second filer 120, a first mass storage 130, a second mass storage 140, and an interconnect 150.

The first filer 110 includes a processor, a main memory, and software for executing instructions (not shown, but understood by one skilled in the art). The second filer 120 includes a processor, a main memory, and software for executing instructions (not shown, but understood by one skilled in the art). Although the first filer 110 and second filer 120 are shown as separate devices there is no requirement that they be separate devices.

The first mass storage 130 includes any one of a number of types of storage, including but not limited to, tape drives, hard drives, and optical drives. The second mass storage 140 includes any one of a number of types of storage, including but not limited to, tape drives, hard drives, and optical drives. There is no requirement that the first mass storage 130 and second mass storage 140 be the same type of storage medium or that they even be separate devices.

The interconnect 150 couples the first filer 110 to the second filer 120 enabling the first filer 110 and second filer 120 to communicate.

The first filer link 160 couples the first filer 110 to the first mass storage 130 and to the second mass storage 140. The second filer link 170 couples the second filer 120 to the second mass storage 140 and to the first mass storage 130.

Method of Use

Figure 2:
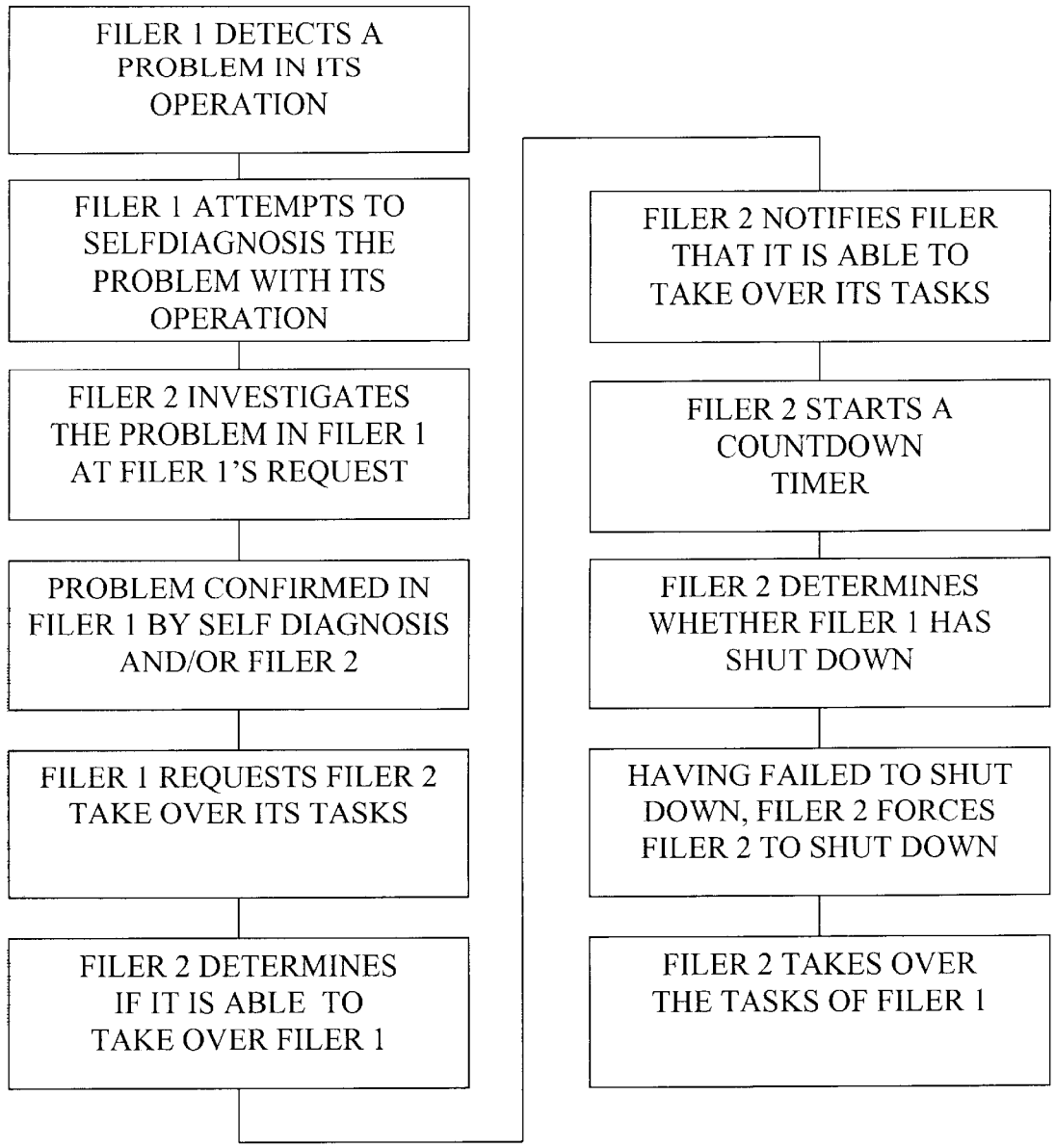
FIG. 2 shows a process flow diagram of a method for operating a system for negotiating takeover in high availability cluster.

FIG. 2 shows a process flow chart of a method 200 for operating a system for negotiating takeover in high availability cluster. The method 200 is performed by the system 100. Although the method 200 is described serially, the steps of the method 200 can be performed by separate elements in conjunction or in parallel, whether asynchronously, in a pipelined manner, or otherwise. There's no particular requirement that the method 200 be performed in the same order in which this description lists the steps, except were so indicated.

At a flow point 200, the system 100 is ready to begin performing a method 200. At a step 201, the first filer 110 becomes aware it has a problem through hardware and software monitoring techniques. The second filer 120 may become aware that the first filer 110 has a problem without notification from the first filer 110. This can occur when the second filer 120 no longer receives heartbeat messages from the first filer 110.

At a step 203, the first filer 110 attempts to self diagnose the problem. The first filer 110 may also ask the second filer 120 to test whether it also has the same problem so as to determine if the problem can be attributed to something other than the first filer 110.

At a step 205, the second filer 120 investigates the problem, as requested by the first filer 110, by attempting to accomplish what the first filer 110 indicates it cannot do.

At a step 207, the problem is confirmed as a problem with the operation of the first filer 110 through self diagnosis or collective intelligence with the assistance of the second filer 120.

At a step 209, the first filer 110 requests that the second filer 120 takeover its tasks.

At a step 211, the second filer 120 determines whether it is able to take over the functions of the first filer 110 by ensuring that it is not impaired or recovering from recent impairment.

At a step 213, the second filer 120 notifies the first filer 110 that it is able to takeover the tasks of the first filer 110 by requesting that the first filer 110 shut down.

At a step 215, the second filer 120 starts a countdown timer determined to give the first filer 110 sufficient time to gracefully shut down, or be forcibly shutdown if it fails to do so. It should be noted that step 213 should precede step 215.

At a step 217, at the expiration of the countdown timer, the second filer 120 checks to see if the first filer 110 has shut down. If it is determined that the first filer 110 has shut down the method 200 is continued at step 221.

At a step 219, determining that the first filer 110 has failed to shut down, the second filer 120 sends messages to the first filer 110 forcing the first filer 110 to shut down.

At a step 221, the second filer 120 assumes the tasks of the first filer 110 through a takeover process.

Generality of the Invention

The invention has general applicability to various fields of use, not necessarily related to the services described above. For example, these fields of use can include one or more of, or some combination of, the following:

In addition to general applicability to file servers the invention has broad applicability to networks and network devices. Other and further applications of the invention, in its most general form, will be clear to those skilled in the art after perusal of this application, and are within the scope and spirit of the invention.

Alternate Embodiments

Although preferred embodiments are disclosed herein, many variations are possible which remain within the concept, scope, and spirit of the invention, and these variations would become clear to those skilled in the art after perusal of this application.

What is claimed is:

1. An apparatus comprising:

a first filer;

a second filer;

an interconnect between said first filer and said second filer;

a means of detecting a soft failure state at said first filer;

a means of communicating said soft failure state to said second filer;

a means of responding to said soft failure state when and if said second filer can do so usefully; and a means of taking over after said responding to said soft failure state;

wherein a means of taking over after said responding to said soft failure state further comprises a means of shutting down said first filer;

wherein a countdown timer counts for a predetermined duration sufficient to allow said first filer to shut down gracefully; and wherein notification of shutdown is transmitted from said first filer to said second filer prior to expiration of said countdown timer.

2. The apparatus of claim 1, wherein said first filer comprises a file server capable of responding to requests for data transfer.

3. The apparatus of claim 1, wherein said second filer comprises a file server capable of responding to requests for data transfer.

4. The apparatus of claim 1, wherein said interconnect facilitates communication between said first filer and said second filer.

5. The apparatus of claim 4, wherein said communication is bi-directional.

6. The apparatus of claim 1, wherein said means of detecting a soft failure state at said first filer is accomplished by said first filer.

7. The apparatus of claim 1, wherein said means of communicating said soft failure state further comprises;

a means of diagnosing said first filer;

a means of requesting help from said second filer.

8. The apparatus of claim 7, wherein said diagnosis of said first filer involves self diagnosis by said first filer.

9. The apparatus of claim 7, wherein said diagnosis of said first filer involves comparison of said second filer's operational characteristics with those of said first filer.

10. The apparatus of claim 7, wherein said diagnosis of said first filer involves testing said second filer's ability to perform tasks said first filer has identified in said information relating to of said first filer it cannot perform.

11. The apparatus of claim 7, wherein said means of requesting help comprises a message containing information relating to said soft failure state of said first filer as identified by said first filer.

12. The apparatus of claim 11, wherein said message is transmitted from said first filer to said second filer.

13. The apparatus of claim 12, wherein said message is transmitted via said interconnect.

14. The apparatus of claim 1, wherein said means of responding to said soft failure state when and if said second filer can do so usefully further comprises a means of determining whether said second filer is impaired.

15. The apparatus of claim 1, wherein said means of responding to said soft failure state when and if said second filer can do so usefully further comprises a means of determining whether said second filer is recovering from recent impairment.

16. The apparatus of claim 1, wherein a request to shut down is sent from said second filer to said first filer.

17. The apparatus of claim 1, wherein said first filer fails to shut down prior to expiration of said countdown timer causing said second filer to send messages determined to force said first filer to shut down.

18. A method of operating a filer cluster comprising the steps of:

operating a first filer;

operating a second filer;

creating an interconnect between said first filer and said second filer;

detecting a soft failure state at said first filer communication said soft failure state to said second filer responding to said soft failure state when and if said second filer can do so usefully; and taking over after said responding to said soft failure state;

wherein said step of taking over after said responding to said soft failure state further comprises the steps of shutting down said first filer and assuming the tasking of said first filer by said second filer;

wherein said step of shutting down said first filer is accomplished by sending a shutdown request from said second filer to said first filer;

wherein a countdown timer counts for a predetermined duration sufficient to allow said first filer to shut down gracefully; and wherein notification of shutdown is transmitted from said first filer to said second filer.

19. The method of claim 18, wherein said step of operating a first filer is responsive to requests for data transfer.

20. The method of claim 18, wherein said step of operating a second filer is responsive to requests for data transfer.

21. The method of claim 18, wherein said step of creating an interconnect between said first filer and said second filer facilitates communication between said first filer and said second filer.

22. The method of claim 21, wherein said communication is bidirectional.

23. The method of claim 18, wherein step of detecting a soft failure state at said first filer is accomplished by said first filer.

24. The method of claim 18, wherein said step of communicating said software failure state further comprises the steps of;

diagnosing said first filer;

requesting help from said second filer.

25. The method of claim 24, wherein said step of diagnosing said first filer is accomplished by said first filer.

26. The method of claim 24, wherein said step of diagnosing said first filer is accomplished by comparison of said second filer's operational characteristics with those of said first filer.

27. The method of claim 24, wherein said step of diagnosing said first filer is accomplished by testing said second filer's ability to perform tasks said first filer has identified is said information relating to a failure of said first filer it cannot perform.

28. The method of claim 24, wherein said step of requesting help creates a message containing information relating to said soft failure state of said first filer as identified by said first filer.

29. The method of claim 28, wherein said message is transmitted from said first filer to said second filer.

30. The method of claim 29, wherein said message is transmitted via said interconnect.

31. The method of claim 18, wherein said step of responding to said soft failure state when and if said second filer can do so usefully further comprises the step of determining whether said second filer is impaired.

32. The method of claim 18, wherein said step of responding to said soft failure state when and if said second filer can do so usefully further comprises the step of determining whether said second filer is recovering from recent impairment.

33. The method of claim 18, wherein said countdown timer expires and said second filer sends messages determined to force said first filer to shut down.

* * * * *